US010798101B2

(12) United States Patent
McAlister

(10) Patent No.: US 10,798,101 B2
(45) Date of Patent: *Oct. 6, 2020

(54) MANAGING SECURITY GROUPS FOR DATA INSTANCES

(71) Applicant: Amazon Technologies, Inc., Seattle, WA (US)

(72) Inventor: Grant Alexander MacDonald McAlister, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/290,421

(22) Filed: Mar. 1, 2019

(65) Prior Publication Data

US 2019/0268347 A1 Aug. 29, 2019

Related U.S. Application Data

(63) Continuation of application No. 15/645,886, filed on Jul. 10, 2017, now Pat. No. 10,225,262, which is a
(Continued)

(51) Int. Cl.
*H04L 29/06* (2006.01)
*G06F 21/60* (2013.01)

(52) U.S. Cl.
CPC .......... *H04L 63/104* (2013.01); *G06F 21/604* (2013.01)

(58) Field of Classification Search
CPC ............. H04L 63/0227; H04L 63/0263; H04L 63/0236
(Continued)

(56) References Cited

U.S. PATENT DOCUMENTS 5,263,165 A 11/1993 Janis
6,018,746 A 1/2000 Hill et al.
(Continued)

FOREIGN PATENT DOCUMENTS

CN 101099172 1/2008
CN 101501688 8/2009
(Continued)

OTHER PUBLICATIONS

"Examination Report dated Oct. 19, 2012", Singapore Application 201202870-0, dated Oct. 19, 2012, 8 pages.
(Continued)

*Primary Examiner* — Evans Desrosiers
(74) *Attorney, Agent, or Firm* — Robert C. Kowert; Kowert, Hood, Munyon, Rankin & Goetzel, P.C.

(57) ABSTRACT

Access level and security group information can be updated for a data instance without having to take down or recycle the instance. A data instance created in a data environment will have at least one default security group. Permissions can be applied to the default security group to limit access via the data environment. A control security group can be created in a control environment and associated with the default security group. Permissions can be applied and updated with respect to the control security group without modifying the default security group, such that the data instance does not need to be recycled or otherwise made unavailable. Requests to perform actions with respect to the control security groups are made via the control environment, while allowing native access to the data via the data environment.

20 Claims, 6 Drawing Sheets

Related U.S. Application Data continuation of application No. 12/416,017, filed on Mar. 31, 2009, now Pat. No. 9,705,888.

(58) Field of Classification Search
USPC .......................................................... 726/4
See application file for complete search history.

(56) References Cited

U.S. PATENT DOCUMENTS

| | | |
|---|---|---|
| 6,442,707 B1 | 8/2002 | McGrath et al. |
| 6,542,907 B1 | 4/2003 | Cohen |
| 6,560,639 B1 | 5/2003 | Dan et al. |
| 6,611,867 B1 | 8/2003 | Bowman-Amuah et al. |
| 6,675,299 B2 | 1/2004 | Porter et al. |
| 6,981,135 B1 | 12/2005 | Trask |
| 6,985,955 B2 | 1/2006 | Gullotta et al. |
| 6,988,139 B1 | 1/2006 | Jervis et al. |
| 7,065,624 B1 | 6/2006 | Zahavi |
| 7,124,289 B1 | 10/2006 | Suorsa |
| 7,133,907 B2 | 11/2006 | Carlson et al. |
| 7,315,526 B2 | 1/2008 | Zhang et al. |
| 7,418,484 B2 | 8/2008 | Presley |
| 7,478,263 B1 | 1/2009 | Kownacki et al. |
| 7,506,021 B2 | 3/2009 | Polan et al. |
| 7,536,056 B2 | 5/2009 | Berkner et al. |
| 7,680,771 B2 | 3/2010 | Cialini et al. |
| 7,769,721 B2 | 8/2010 | Ueoka et al. |
| 7,801,932 B2 | 9/2010 | Krishnaswamy |
| 7,827,547 B1 | 11/2010 | Sutherland et al. |
| 7,966,528 B2 | 6/2011 | Troppmann et al. |
| 7,991,749 B2 | 8/2011 | Nishikawa et al. |
| 8,020,037 B1 | 9/2011 | Schwartz et al. |
| 8,041,679 B1 | 10/2011 | Narayanan |
| 8,078,587 B2 | 12/2011 | Wahlert et al. |
| 8,121,981 B2 | 2/2012 | Simek et al. |
| 8,150,808 B2 | 4/2012 | Zha et al. |
| 8,150,904 B2 | 4/2012 | Queck et al. |
| 8,156,082 B2 | 4/2012 | Srivastava et al. |
| 8,307,003 B1 | 11/2012 | Gangadhar et al. |
| 8,352,608 B1 | 1/2013 | Keagy et al. |
| 8,364,460 B2 | 1/2013 | Ostermeyer et al. |
| 8,392,915 B2 | 3/2013 | Friedman et al. |
| 8,676,753 B2 | 3/2014 | Sivasubramanian et al. |
| 8,713,061 B1 | 4/2014 | Sheth et al. |
| 10,225,262 B2 | 3/2019 | McAlister |
| 2001/0007133 A1* | 7/2001 | Moriconi ............... G06F 21/604 726/6 |
| 2002/0001984 A1 | 1/2002 | Franzen et al. |
| 2002/0019844 A1 | 2/2002 | Kurowski et al. |
| 2002/0032883 A1 | 3/2002 | Kampe et al. |
| 2002/0147709 A1 | 10/2002 | Rajarajan et al. |
| 2004/0078637 A1 | 4/2004 | Fellin et al. |
| 2004/0148443 A1 | 7/2004 | Achiwa |
| 2004/0225659 A1 | 11/2004 | O'Brien et al. |
| 2004/0267835 A1 | 12/2004 | Zwilling et al. |
| 2005/0004999 A1 | 1/2005 | Moore et al. |
| 2005/0038831 A1 | 2/2005 | Souder et al. |
| 2005/0193245 A1 | 9/2005 | Hayden et al. |
| 2005/0262164 A1 | 11/2005 | Guiheneuf et al. |
| 2005/0283655 A1 | 12/2005 | Ashmore |
| 2005/0289310 A1 | 12/2005 | Miki |
| 2006/0019535 A1 | 1/2006 | Fukushima et al. |
| 2006/0041641 A1 | 2/2006 | Breiter et al. |
| 2006/0053251 A1 | 3/2006 | Nicholson et al. |
| 2006/0104231 A1 | 5/2006 | Gidwani |
| 2006/0106675 A1 | 5/2006 | Cohen et al. |
| 2006/0106774 A1 | 5/2006 | Cohen et al. |
| 2007/0078982 A1 | 4/2007 | Aidun et al. |
| 2007/0083588 A1 | 4/2007 | Keller et al. |
| 2007/0156872 A1 | 7/2007 | Stoyanova |
| 2007/0162420 A1 | 7/2007 | Ou et al. |
| 2007/0192329 A1 | 8/2007 | Croft et al. |
| 2007/0234028 A1 | 10/2007 | Rothman et al. |
| 2007/0234115 A1 | 10/2007 | Saika |
| 2007/0260693 A1 | 11/2007 | Cardone et al. |
| 2007/0260696 A1 | 11/2007 | Bohannon et al. |
| 2007/0260912 A1 | 11/2007 | Hatasaki et al. |
| 2007/0271275 A1 | 11/2007 | Fassette et al. |
| 2007/0283443 A1 | 12/2007 | McPherson et al. |
| 2008/0010513 A1 | 1/2008 | Devarakonda et al. |
| 2008/0016293 A1 | 1/2008 | Saika |
| 2008/0040509 A1 | 2/2008 | Werb et al. |
| 2008/0052327 A1 | 2/2008 | Buah |
| 2008/0059123 A1* | 3/2008 | Estberg ............... G06Q 10/06 702/188 |
| 2008/0065650 A1 | 3/2008 | Kim et al. |
| 2008/0109448 A1 | 5/2008 | Aboel-Nil et al. |
| 2008/0126734 A1 | 5/2008 | Murase |
| 2008/0162590 A1 | 7/2008 | Kundu et al. |
| 2008/0189769 A1 | 8/2008 | Casado et al. |
| 2008/0195052 A1 | 8/2008 | Lelcuk et al. |
| 2008/0244579 A1 | 10/2008 | Muller |
| 2008/0256384 A1 | 10/2008 | Branson et al. |
| 2008/0301663 A1 | 12/2008 | Bahat et al. |
| 2009/0006888 A1 | 1/2009 | Bernhard et al. |
| 2009/0019137 A1 | 1/2009 | Mishra et al. |
| 2009/0019535 A1 | 1/2009 | Mishra et al. |
| 2009/0037425 A1 | 2/2009 | Erickson et al. |
| 2009/0063509 A1 | 3/2009 | Lockhart et al. |
| 2009/0063563 A1 | 3/2009 | Khangaonkar |
| 2009/0106441 A1 | 4/2009 | Zuckerman et al. |
| 2009/0138577 A1 | 5/2009 | Casado |
| 2009/0164853 A1 | 6/2009 | Gokhale et al. |
| 2009/0300093 A1 | 12/2009 | Griffiths et al. |
| 2010/0036851 A1 | 2/2010 | Paterson-Jones et al. |
| 2010/0077160 A1 | 3/2010 | Liu et al. |
| 2010/0125555 A1 | 5/2010 | Lau et al. |
| 2010/0198972 A1 | 8/2010 | Umbehocker |
| 2010/0211548 A1 | 8/2010 | Ott et al. |
| 2010/0251339 A1 | 9/2010 | McAlister |
| 2010/0262650 A1 | 10/2010 | Chauhan et al. |
| 2011/0004916 A1 | 1/2011 | Schiffman et al. |
| 2011/0178793 A1 | 7/2011 | Giffin et al. |
| 2011/0288847 A1 | 11/2011 | Narayanan et al. |
| 2013/0066834 A1 | 3/2013 | McAlister et al. |
| 2013/0066923 A1 | 3/2013 | Sivasubramanian et al. |
| 2014/0201363 A1 | 7/2014 | McAlister et al. |
| 2014/0229698 A1 | 8/2014 | Sivasubramanian et al. |

FOREIGN PATENT DOCUMENTS

| | | |
|---|---|---|
| CN | 101512507 | 8/2009 |
| CN | 101539841 | 9/2009 |
| JP | 10-312327 A | 11/1998 |
| JP | 2000172721 | 6/2000 |
| JP | 2003330781 | 11/2003 |
| JP | 2004206694 | 7/2004 |
| JP | 2004362596 | 12/2004 |
| JP | 2005-267056 A | 9/2005 |
| JP | 2005267056 | 9/2005 |
| JP | 2006-011874 A | 1/2006 |
| JP | 2006048676 | 2/2006 |
| JP | 2006065845 | 3/2006 |
| JP | 2007516510 | 6/2007 |
| JP | 2008009809 | 1/2008 |
| JP | 2008141339 | 6/2008 |
| JP | 2009522659 | 6/2009 |
| JP | 2009-230742 A | 10/2009 |
| WO | 2009012296 | 1/2009 |
| WO | 2009036079 | 3/2009 |

OTHER PUBLICATIONS

"Examination Report dated Oct. 29, 2012", Singapore Application 201202868-4, dated Oct. 29, 2012, 5 pages.

"Examination Report dated Oct. 9, 2012", Singapore Application 201107040-6, dated Oct. 9, 2012, 5 pages.

"Examination Report dated Dec. 11, 2012", Singapore Application 201202502-9, dated Dec. 11, 2012, 8 pages.

"Examination Report dated May 17, 2013", Singapore Application 201202967-4, dated May 17, 2013, 10 pages.

"Extended European Search Report dated Sep. 19, 2013", Europe Application 10827392.1, 6 pages.

(56) References Cited

OTHER PUBLICATIONS

"Final Office Action dated Oct. 14, 2011", U.S. Appl. No. 12/415,958, dated Oct. 14, 2011, 34 pages.
"Final Office Action dated Oct. 16, 2012", U.S. Appl. No. 12/575,381, dated Oct. 16, 2012, 42 pages.
"Final Office Action dated Oct. 19, 2011", U.S. Appl. No. 12/418,475, dated Oct. 19, 2011, 26 pages.
"Final Office Action dated Nov. 1, 2012", U.S. Appl. No. 12/606,106, dated Nov. 1, 2012, 29 pages.
"Final Office Action dated Dec. 19, 2011", U.S. Appl. No. 12/415,968, dated Dec. 19, 2011.
"Final Office Action dated Feb. 22, 2013", U.S. Appl. No. 13/294,099, dated Feb. 22, 2013.
"Final Office Action dated Mar. 22, 2011", U.S. Appl. No. 12/415,998, dated Mar. 22, 2011.
"Non Final Office Action dated Jan. 2, 2013", U.S. Appl. No. 13/620,962, dated Jan. 2, 2013.
"Non Final Office Action dated Jan. 31, 2014", U.S. Appl. No. 12/415,998, 20 pages.
"Non Final Office Action dated Oct. 14, 2010", U.S. Appl. No. 12/415,998, dated Oct. 14, 2010.
"Non Final Office Action dated Dec. 14, 2010", U.S. Appl. No. 12/415,987, dated Dec. 14, 2010.
"Non Final Office Action dated Feb. 14, 2011", U.S. Appl. No. 12/606,097, dated Feb. 14, 2011.
"Non Final Office Action dated Mar. 14, 2012", U.S. Appl. No. 12/606,093, dated Mar. 14, 2012, 24 pages.
"Non Final Office Action dated Mar. 18, 2013", U.S. Appl. No. 13/299,601, dated Mar. 18, 2013.
"Non Final Office Action dated Apr. 18, 2012", U.S. Appl. No. 12/575,381, dated Apr. 18, 2012, 31 pages.
"Non Final Office Action dated Apr. 29, 2011", U.S. Appl. No. 12/415,968, dated Apr. 29, 2011, 30 pages.
"Non Final Office. Action dated May 2, 2011", U.S. Appl. No. 12/418,475, dated May 2, 2011, 20 pages.
"Non Final Office Action dated May 2, 2011", U.S. Appl. No. 12/415,958, dated May 2, 2011, 23 pages.
"Non Final Office Action dated May 28, 2013", U.S. Appl. No. 12/606,106, dated May 28, 2013.
"Non Final Office Action dated May 31, 2012", U.S. Appl. No. 12/606,106, dated May 31, 2012, 29 pages.
"Non Final Office Action dated Jun. 20, 2013", U.S. Appl. No. 13/621,073.
"Non Final Office Action dated Jun. 20, 2013", U.S. Appl. No. 13/620,999, dated Jun. 20, 2013.
"Non Final Office Action dated Jul. 23, 2013", Japan Application 2012-536964, dated Jul. 23, 2013.
"Non Final Office Action dated Jul. 23, 2013", Japan Application 2012-536966, dated Jul. 23, 2013.
"Non Final Office Action dated Sep. 13, 2012", U.S. Appl. No. 13/294,099, dated Sep. 13, 2012.
"Non Final Office Action dated Sep. 14, 2012", U.S. Appl. No. 13/299,601, dated Sep. 14, 2012, 15 pages.
"Notice of Allowance dated Oct. 24, 2012", U.S. Appl. No. 12/606,093, dated Oct. 24, 2012, 13 pages.
"Notice of Allowance dated Nov. 13, 2012", U.S. Appl. No. 12/415,968, dated Nov. 13, 2012.
"Notice of Allowance dated Nov. 13, 2013", U.S. Appl. No. 12/606,106.
"Notice of Allowance dated Nov. 19, 2013", Japan Application 2012-536964.
"Notice of Allowance dated Nov. 19, 2013", Japan Application 2012-536966.
"Notice of Allowance dated Nov. 20, 2013", U.S. Appl. No. 12/606,106.
"Notice of Allowance dated Dec. 26, 2013", U.S. Appl. No. 12/415,958.
"Notice of Allowance dated Dec. 30, 2013", U.S. Appl. No. 13/620,999.
"Notice of Allowance dated Dec. 30, 2013", U.S. Appl. No. 13/621,073.
"Notice of Allowance dated Mar. 16, 2012", U.S. Appl. No. 12/418,475, dated Mar. 16, 2012, 11 pages.
"Notice of Allowance dated Mar. 9, 2012", U.S. Appl. No. 12/415,958, dated Mar. 9, 2012, 29 pages.
"Notice of Allowance dated Apr. 15, 2011", U.S. Appl. No. 12/415,987, dated Apr. 15, 2011.
"Notice of Allowance dated Apr. 18, 2013", U.S. Appl. No. 13/620,962, dated Apr. 18, 2013.
"Notice of Allowance dated Jun. 1, 2012", U.S. Appl. No. 12/415,968, dated Jun. 1, 2012.
"Notice of Allowance dated Jun. 26, 2012", U.S. Appl. No. 12/606,093, dated Jun. 26, 2012, 8 pages.
"Notice of Allowance dated Jun. 28, 2012", U.S. Appl. No. 12/418,475, dated Jun. 28, 2012, 20 pages.
"Notice of Allowance dated Jul. 12, 2011", U.S. Appl. No. 12/606,097, dated Jul. 12, 2011.
"Notice of Allowance dated Jul. 5, 2012", U.S. Appl. No. 12/415,958, dated Jul. 5, 2012, 14 pages.
"Notice of Allowance dated Jul. 9, 2013", Japan Application 2012-533307, dated Jul. 9, 2013.
"Notice of Allowance dated Aug. 12, 2013", U.S. Appl. No. 13/299,601, dated Aug. 12, 2013.
"Notice of Allowance dated Aug. 26, 2013", U.S. Appl. No. 13/620,962, dated Aug. 26, 2013.
"Notice of Allowance dated Aug. 8, 2011", U.S. Appl. No. 12/415,987, dated Aug. 8, 2011.
"Supplemental Notice of Allowance dated Oct. 25, 2013", U.S. Appl. No. 13/294,099.
"Written Opinion dated Oct. 2, 2012", Singapore Application 201202967-4, dated Oct. 2, 2012, 14 pages.
"Written Opinion dated Feb. 15, 2012", Singapore Application 201107040-6, dated Feb. 15, 2012, 6 pages.
Battles, Brett et al., "Reducing Data Center Power Consumption Through Efficient Storage", Google Scholar, <http://www.it-executive.nl/images/downloads/reducing-datacenter-power.pdf>, 2007, 9 pages.
Cordy, James R. , "Practical Language—Independent Detection of Near-Miss Clones", ACM, <http://delivery.acm.org/10.1145/1040000/1034915/p1-cordy.pdf>, 2001, 12 pages.
Ghemawat, Sanjay et al., "The Google File System", SOSP'03, Bolton Landing, New York., Oct. 19, 2003, 15 pages.
Lahiri, Tirthankar et al., "Cache Fusion: Extending Shared—Disk Clusters with Shared Caches", 27th VLDB Conference; Roma, Italy., 2001, 4 pages.
Lomet, David et al., "Recovery from "Bad" User Transactions", ACM, <http://delivery.acm.org/10.1145/1150000/1142512/p337-lomet.pdf>, 2006, 10 pages.
Lorentz, Diana et al., "Oracle 9i SQL", Release 2 (9.2), Oracle Corporation., 2002, 5 pages.
Mietzner, Ralph et al., "Towards Provisioning the Cloud: On the Usage of Multi-Granularity Flows and Services to Realize a Unified Provisioning Infrastructure for SaaS Applications", 2008 IEEE Congress on Services, Part 1, 2008, 3-10.
Wang, Yi et al., "Virtual Routers on the Move: Live Router Migration as a Network-Management Primitive", ACM, <http://delivery.acm.org/10.1145/1410000/1402985/p231-wang.pdf>, 2008, 12 pages.
Examination Report dated Dec. 11, 2012; in corresponding Singaporean patent application No. 201202502-9.
Examination Report dated Oct. 29, 2012; in corresponding Singaporean patent application No. 201202868-4.
Examination Report dated Oct. 19, 2012; in Singaporean patent application No. 201202870-0.
Invitation to Respond to Written Opinion dated Sep. 14, 2012; in corresponding Singaporean patent application No. 201202967-4.
Examination Report dated Oct. 30, 2012; in corresponding Singaporean patent application No. 201107040-6.
Final Office Action dated Jul. 22, 2014; in corresponding U.S. Appl. No. 12/415,998.
IBM Redbook, San Volume Controller: Best Practices and Performances Guidelines (draft), tate et al ; Jul. 2007.

(56) References Cited

OTHER PUBLICATIONS

Unix/Linux Administration Logical Volume Management Guide; 2005.
Z/VM and Linux on IBM System z The virtualization cookbook for Red hat Enterprise Linux 5.2.; Oct. 2008.
Non-Final Officer Action dated Jul. 30, 2014; in corresponding U.S. Appl. No. 12/575,381.
English abstract for JP2007516510; published Jun. 21, 2007 and retrieved on Feb. 6, 2015.
Non-Final Office Action dated May 7, 2014; in corresponding U.S. Appl. No. 13/621,044.
Office Action dated Apr. 14, 2014; in corresponding Canadian patent application No. 2,776,384.
Office Action dated Apr. 3, 2014; in corresponding Canadian patent application No. 2,778,110.
English translation of the First Office Action dated Apr. 21, 2014; in corresponding Chinese patent application No. 201080056327.0.
The First Office Action dated Apr. 21, 2014; in corresponding Chinese patent application No. 201080056327.0.
Certificate of Grant of patent dated Oct. 24, 2014; in corresponding Singapore patent application No. 201202502.9.
English translation of the Notice of the First Office Action dated Jun. 12, 2014; in corresponding Chinese application No. 201080049395.4.
The Notice of the First Office Action dated Jun. 12, 2014; in corresponding Chinese patent application No. 201080049395.4.
Supplementary European Search Report dated Oct. 9, 2013; in corresponding European patent application No. 10827392.1.
Letters patent dated Apr. 25, 2014; in corresponding Japanese patent application No. 2012-536965.
Certificate of Grant of patent dated Nov. 25, 2014; in corresponding Singapore patent application No. 201202868.4.
Examiner's Report dated Jul. 25, 2014; in corresponding Canadian patent application No. 2,778,723.
English translation of the Notice of Allowance and Fee(s) due dated Mar. 18, 2014; in corresponding Japanese patent application No. 2012-536965.
Certificate of Grant of patent dated Jul. 7, 2014; in corresponding Singapore patent application No. 2012028700.
Office Action dated Sep. 16, 2014; in corresponding Japanese patent application No. 2013-262835.
English translation of the Office Action dated Sep. 16, 2014; in corresponding Japanese patent application No. 2013-262835.
English abstract for CN101512507; published on Aug. 19, 2009 and retrieved on Nov. 4, 2014.
English abstract for CN101539841; published on Sep. 23, 2009 and retrieved on Nov. 4, 2014.
English abstract for JP2008009809; published on Jan. 17, 2008 and retrieved on Nov. 4, 2014.
English abstract for JP2006065845; published on Mar. 9, 2006 and retrieved on Nov. 4, 2014.
English abstract for JP2009522659; published Jun. 11, 2009 and retrieved on Nov. 4, 2014.
English abstract for JP2006048676; published Feb. 16, 2006 and retrieved on Nov. 4, 2014.
English abstract for CN101501688; published Aug. 5, 2009 and retrieved on Nov. 4, 2014.
English abstract for JP2008141339; published on Jun. 19, 2008 and retrieved on Feb. 6, 2015.

English abstract for CN101099172; published on Jan. 2, 2008 and retrieved on Feb. 6, 2015.
English abstract for JP2000172721; published on Jun. 23, 2000 and retrieved on Feb. 6, 2015.
English abstract for JP2004206694; published Jul. 22, 2004 and retrieved on Feb. 6, 2015.
English abstract for JP2004362596; published Dec. 24, 2004 and retrieved on Feb. 6, 2015.
English abstract for JP2005267056; published Sep. 29, 2005 and retrieved on Feb. 6, 2015.
McNett; Usher: An Extensible Framework for Managing Clusters of Virtual Machines; pp. 167-181 of the Proceedings of the 21st Large Installation System Administration Conference (LISA '07) Nov. 11-16, 2007.
English abstract for JP2003330781; published Nov. 21, 2003 and retrieved on Jan. 8, 2015.
Certificate of Grant dated May 21, 2014; in corresponding Singaporean patent application No. 201107040.6.
Amazon HQ WIKI, "RDSMySQLConfigManagement/ConfigExecSummary", RDS/EDS/DesignDocs/RDSMySQLConfigManagement/ConfigExecSummary from https://w.amazon.com/index.php/RDS/EDS/ConfigExecSummary; downloaded Aug. 11, 2009.
English translation Notice of Allowance and Fee(s) Due dated Sep. 2, 2014; in corresponding Japanese patent application No. 2012-503674.
Office Action dated Jul. 7, 2014; in corresponding Chinese patent application No. 201080015811.9.
English translation of the Office Action dated Jul. 7, 2014; in corresponding Chinese patent application No. 201080015811.9.
Notice on the Third Office Action dated Jan. 19, 2015; in corresponding Chinese patent application No. 201080015811.9.
English translation Notice on the Third Office Action dated Jan. 19, 2015; in corresponding Chinese patent application No. 201080015811.9.
Candan, K. Selcuk; Frontiers in Information and Software as Services; 2009 IEEE international Conference on Data Engineering.
Cases for E-Business Application Using Web Services Technology and Research and Study of Problems, 1st Edition, Mar. 31, 2004, pp. 1-5.
Amazon HQ Wiki, "RDSMySQLConfigManagement/ConfigWorkflowDesign", RDS/EDS/DesignDocs/RDSMySQLConfigManagement/ConfigWorkflowDesign from hhttps://w.amazon.com/index.php/RDS/EDS/DesignDocs/RDSMySQLConfigManagement/ConfigWorkflowDesign; downloaded Feb. 11, 2009.
Office Action dated Oct. 3, 2013; in corresponding Canadian patent application No. 2,755,913.
Non-Final Office Action dated Mar. 14, 2013; in corresponding U.S. Appl. No. 12/606,093.
Office Action dated Aug. 22, 2014; in corresponding Canadian patent application No. 2,755,913.
English translation of the First Office Action dated Oct. 21, 2013; in corresponding Chinese patent application No. 201080015811.9.
The First Office Action dated Oct. 21, 2013; in corresponding Chinese patent application No. 201080015811.9.
The Office Action dated Dec. 3, 2013; in corresponding Japanese patent application No. 2012-503674.
English translation of the Office Action dated Dec. 3, 2013; in corresponding Japanese patent application No. 2012-503674.

* cited by examiner

Security Access Configuration

| | | |
|---|---|---|
| Customer Identifier | Customer Group A ▽ | |
| Security Group Name | Developer1 | ← 602 |
| Security Group Password | ******** | ← 604 |
| Security Group Access | Read and Write ▽ | |
| Security Group Status | Active | |
| Security Group Name | Analyst1 | |
| Security Group Password | ******** | |
| Security Group Access | Read Only ▽ | |
| Security Group Status | Active | |

FIG. 6 though a Web-based envi-
MANAGING SECURITY GROUPS FOR DATA INSTANCES

CROSS-REFERENCE TO RELATED APPLICATIONS

This application is a continuation of U.S. patent application Ser. No. 15/648,886, filed Jul. 10, 2017, which is a continuation of U.S. patent application Ser. No. 12/416,017, filed Mar. 31, 2009, now U.S. Pat. No. 9,705,888, which is hereby incorporated by reference herein in its entirety, and which is related to U.S. patent application Ser. No. 12/415,958, entitled "Control Service and Relational Data Management," filed Mar. 31, 2009, now U.S. Pat. No. 8,713,060, which are herein incorporated by reference in their entirety.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND

As an increasing number of applications and services are being made available over networks such as the Internet, an increasing number of content, application, and/or service providers are turning to technologies such as cloud computing. Cloud computing, in general, is an approach to providing access to electronic resources through services, such as Web services, where the hardware and/or software used to support those services is dynamically scalable to meet the needs of the services at any given time. A user or customer typically will rent, lease, or otherwise pay for access to resources through the cloud, and thus does not have to purchase and maintain the hardware and/or software to provide access to these resources.

Customers often need to modify the set of users granted access to a data source, such as where employees or other users are added, deleted, or obtain different access or responsibilities. In conventional systems, users and user access parameters are manually adjusted by a database administrator (DBA) or other such user. The adjustment of the native users of the data source typically affects the availability of the data source for a period of time, as the data source must be taken down to adjust user information for the data source. Such a process is not only time consuming and expensive, but requires periodic outages of the data source.

BRIEF DESCRIPTION OF THE DRAWINGS

Various embodiments in accordance with the present disclosure will be described with reference to the drawings, in which:

FIG. 6 illustrates an example interface for specifying security group parameters that can be performed in accordance with one embodiment.

DETAILED DESCRIPTION

Systems and methods in accordance with various embodiments of the present disclosure may overcome one or more of the aforementioned and other deficiencies experienced in conventional approaches to managing aspects of data storage in an electronic environment. In particular, various embodiments provide a separate control environment, or control plane, that can be used to monitor and/or control aspects of a data environment, or data plane. The functionality of a control plane can be provided as a set of Web services, for example, enabling the control plane to act as a virtual database administrator (DBA). A user or customer can submit a request to the control plane through an externally-visible application programming interface (API), for example, which can be analyzed to determine actions to be performed in the data plane, such as actions that create, delete, modify, expand, or otherwise modify a data store or data storage instance. State information can be passed to a component of the data plane for each task necessary to perform the action, such that the control plane can manage the performance of the tasks without having direct access into the data stores or other such components of the data plane. Once provisioned, a user can have native access to the data instance(s) in the data plane, and can simply point existing applications (such as MySQL applications) to the domain name system (DNS) name or other location information for the particular data instance. There is no restriction or modification of query models or other such functionality, as a user can continue to use applications built on MySQL, Oracle, or other such database technology.

Systems and methods in accordance with various embodiments take advantage of components of the control plane to manage access level and security group information for a data instance without having to take down or recycle the data instance in the data environment. A data instance created in a data environment can have at least one default security group generated. Using the control plane, permissions can be applied to the default security group to limit access via the data environment. At least one control security group can be created using the control plane, which can be associated with the default security group. Permissions can be applied and updated with respect to the control security group without modifying the default security group in the data environment, such that the data instance does not need to be recycled or otherwise made unavailable. Requests to perform actions with respect to the control security groups can be made via the control plane, while allowing native access to the data via the data environment.

Figure 1:
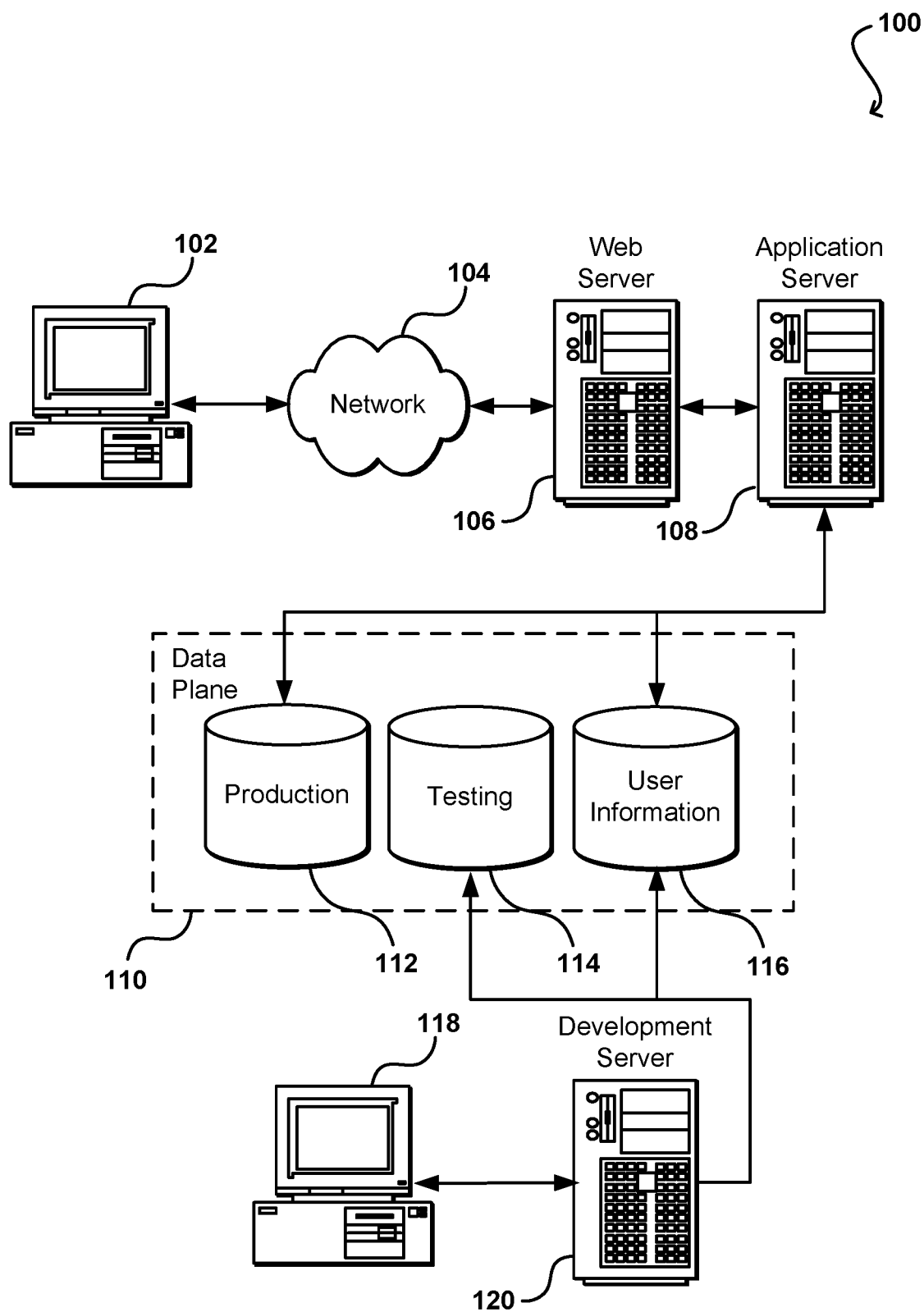
FIG. 1 illustrates an environment in which various embodiments can be implemented.

FIG. 1 illustrates an example of an environment 100 for implementing aspects in accordance with various embodiments. As will be appreciated, although a Web-based environment is used for purposes of explanation, different environments may be used, as appropriate, to implement various embodiments. The environment 100 shown includes both a testing or development portion (or side) and a production portion. The production portion includes an electronic client device 102, which can include any appropriate device operable to send and receive requests, messages, or information over an appropriate network 104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 106 for receiving requests and serving content in response thereto, although for other networks an alternative device serving a similar purpose could be used as would be apparent to one of ordinary skill in the art.

The illustrative environment includes at least one application server 108 and a data store 110. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between the client device 102 and the application server 108, can be handled by the Web server. It should be understood that the Web and application servers are not required and are merely example components, as structured code discussed herein can be executed on any appropriate device or host machine as discussed elsewhere herein. Further, the environment can be architected in such a way that a test automation framework can be provided as a service to which a user or application can subscribe. A test automation framework can be provided as an implementation of any of the various testing patterns discussed herein, although various other implementations can be used as well, as discussed or suggested herein.

The environment also includes a development and/or testing side, which includes a user device 118 allowing a user such as a developer, data administrator, or tester to access the system. The user device 118 can be any appropriate device or machine, such as is described above with respect to the client device 102. The environment also includes a development server 120, which functions similar to the application server 108 but typically runs code during development and testing before the code is deployed and executed on the production side and is accessible to outside users, for example. In some embodiments, an application server can function as a development server, and separate production and testing storage may not be used.

The data store 110 can include several separate data tables, databases, or other data storage mechanisms and media for storing data relating to a particular aspect. For example, the data store illustrated includes mechanisms for storing production data 112 and user information 116, which can be used to serve content for the production side. The data store also is shown to include a mechanism for storing testing data 114, which can be used with the user information for the testing side. It should be understood that there can be many other aspects that may need to be stored in the data store, such as for page image information and access right information, which can be stored in any of the above listed mechanisms as appropriate or in additional mechanisms in the data store 110. The data store 110 is operable, through logic associated therewith, to receive instructions from the application server 108 or development server 120, and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 102. Information for a particular item of interest can be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

An environment such as that illustrated in FIG. 1 can be useful for a provider such as an electronic marketplace, wherein multiple hosts might be used to perform tasks such as serving content, authenticating users, performing payment transactions, or performing any of a number of other such tasks. Some of these hosts may be configured to offer the same functionality, while other servers might be configured to perform at least some different functions. The electronic environment in such cases might include additional components and/or other arrangements, such as those illustrated in the configuration 200 of FIG. 2, discussed in detail below.

Systems and methods in accordance with one embodiment provide a relational database service ("RDS") that enables developers, customers, or other authorized users to easily and cost-effectively obtain and configure relational databases so that users can perform tasks such as storing, processing, and querying relational data sets in a cloud. While this example is discussed with respect to the Internet, Web services, and Internet-based technology, it should be understood that aspects of the various embodiments can be used with any appropriate services available or offered over a network in an electronic environment. Further, while the service is referred to herein as a "relational database service," it should be understood that such a service can be used with any appropriate type of data repository or data storage in an electronic environment. An RDS in this example includes at least one Web service that enables users or customers to easily manage relational data sets without worrying about the administrative complexities of deployment, upgrades, patch management, backups, replication, failover, capacity management, scaling, and other such aspects of data management. Developers are thus freed to develop sophisticated cloud applications without worrying about the complexities of managing the database infrastructure.

An RDS in one embodiment provides a separate "control plane" that includes components (e.g., hardware and software) useful for managing aspects of the data storage. In one embodiment, a set of data management application programming interfaces (APIs) or other such interfaces are provided that allow a user or customer to make calls into the RDS to perform certain tasks relating to the data storage. The user still can use the direct interfaces or APIs to communicate with the data repositories, however, and can use the RDS-specific APIs of the control plane only when necessary to manage the data storage or perform a similar task.

Figure 2:
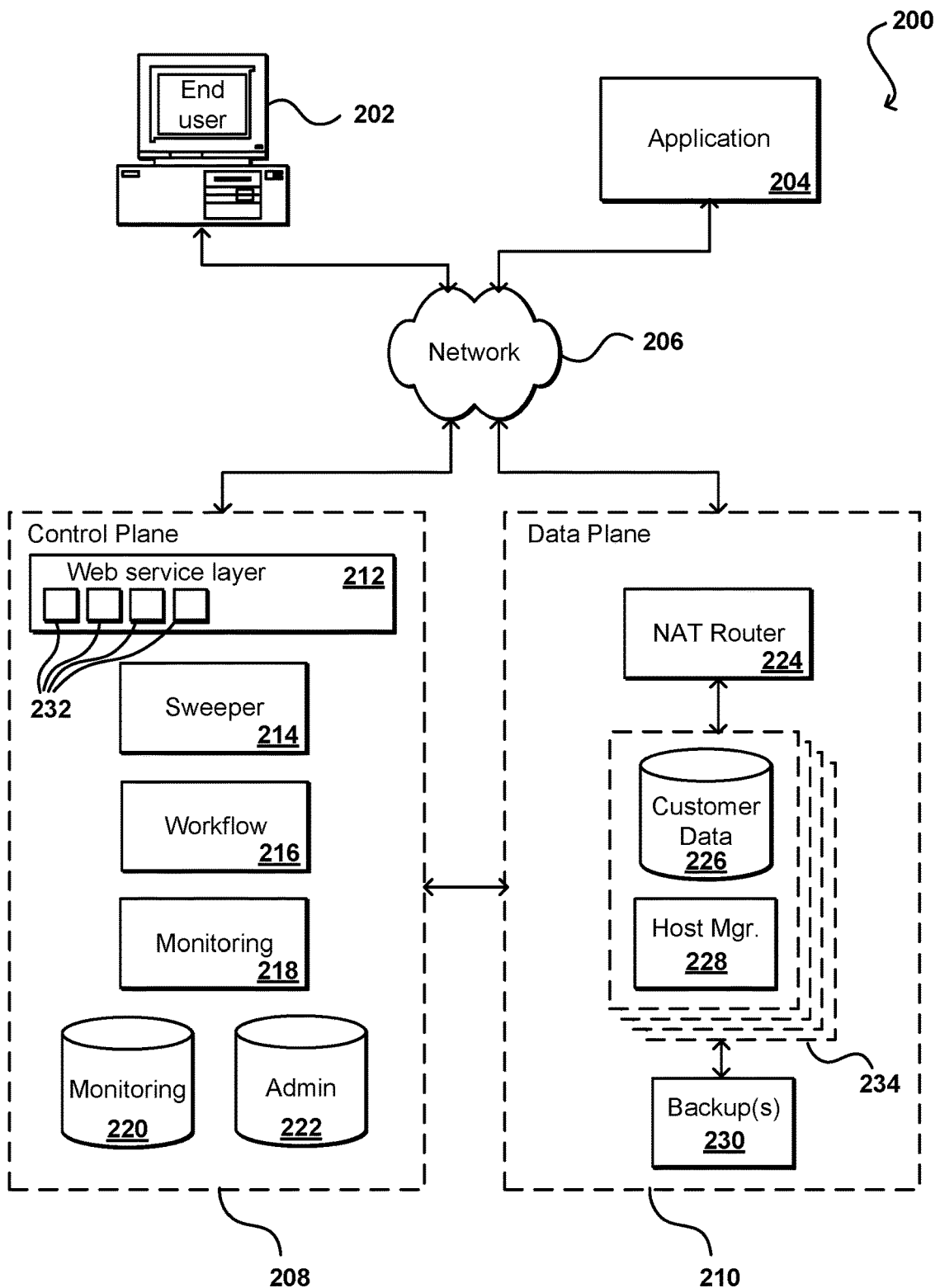
FIG. 2 illustrates an example separation of a control plane and a data plane that can be used in accordance with various embodiments.

FIG. 2 illustrates an example of an RDS implementation 200 that can be used in accordance with one embodiment. In this example, a computing device 202 for an end user is shown to be able to make calls through a network 206 into a control plane 208 to perform a task such as to provision a data repository of the data plane 210. The user or an application 204 can access the provisioned repository directly through an interface of a data plane 210. While an end user computing device and application are used for purposes of explanation, it should be understood that any appropriate user, application, service, device, component, or resource can access the interface(s) of the control plane and/or data plane as appropriate in the various embodiments. Further, while the components are separated into control and data "planes," it should be understood that this can refer to an actual or virtual separation of at least some resources (e.g., hardware and/or software) used to provide the respective functionality.

The control plane 208 in this example is essentially a virtual layer of hardware and software components that handles control and management actions, such as provisioning, scaling, replication, etc. The control plane in this embodiment includes a Web services layer 212, or tier, which can include at least one Web server, for example, along with computer-executable software, application servers, or other such components. The Web services layer also can include a set of APIs 232 (or other such interfaces) for receiving Web services calls or requests from across the network 206, which the Web services layer can parse or otherwise analyze to determine the steps or actions needed to act on or process the call. For example, a Web service call might be received that includes a request to create a data repository. In this example, the Web services layer can parse the request to determine the type of data repository to be created, the storage volume requested, the type of hardware requested (if any), or other such aspects. Information for the request can be written to an administration ("Admin") data store 222, or other appropriate storage location or job queue, for subsequent processing.

A Web service layer in one embodiment includes a scalable set of customer-facing servers that can provide the various control plane APIs and return the appropriate responses based on the API specifications. The Web service layer also can include at least one API service layer that in one embodiment consists of stateless, replicated servers which process the customer APIs. The Web service layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

The control plane in this embodiment includes what is referred to herein as a "sweeper" component 214. A sweeper component can be any appropriate component operable to poll various components of the control plane or otherwise determine any tasks to be executed in response to an outstanding request. In this example, the Web services layer might place instructions or information for the "create database" request in the admin data store 222, or a similar job queue, and the sweeper can periodically check the admin data store for outstanding jobs. Various other approaches can be used as would be apparent to one of ordinary skill in the art, such as the Web services layer sending a notification to a sweeper that a job exists. The sweeper component can pick up the "create database" request, and using information for the request can send a request, call, or other such command to a workflow component 216 operable to instantiate at least one workflow for the request. The workflow in one embodiment is generated and maintained using a workflow service as is discussed elsewhere herein. A workflow in general is a sequence of tasks that should be executed to perform a specific job. The workflow is not the actual work, but an abstraction of the work that controls the flow of information and execution of the work. A workflow also can be thought of as a state machine, which can manage and return the state of a process at any time during execution. A workflow component (or system of components) in one embodiment is operable to manage and/or perform the hosting and executing of workflows for tasks such as: repository creation, modification, and deletion; recovery and backup; security group creation, deletion, and modification; user credentials management; and key rotation and credential management. Such workflows can be implemented on top of a workflow service, as discussed elsewhere herein. The workflow component also can manage differences between workflow steps used for different database engines, such as MySQL, as the underlying workflow service does not necessarily change.

In this example, a workflow can be instantiated using a workflow template for creating a database and applying information extracted from the original request. For example, if the request is for a MySQL® Relational Database Management System (RDBMS) instance, as opposed to an Oracle® RDBMS or other such instance, then a specific task will be added to the workflow that is directed toward MySQL instances. The workflow component also can select specific tasks related to the amount of storage requested, any specific hardware requirements, or other such tasks. These tasks can be added to the workflow in an order of execution useful for the overall job. While some tasks can be performed in parallel, other tasks rely on previous tasks to be completed first. The workflow component or service can include this information in the workflow, and the tasks can be executed and information passed as needed.

An example "create database" workflow for a customer might includes tasks such as provisioning a data store instance, allocating a volume of off-instance persistent storage, attaching the persistent storage volume to the data store instance, then allocating and attaching a DNS (Domain Name System) address or other address, port, interface, or identifier which the customer can use to access or otherwise connect to the data instance. In this example, a user is provided with the DNS address and a port address to be used to access the instance. The workflow also can include tasks to download and install any binaries or other information used for the specific data storage technology (e.g., MySQL). The workflow component can manage the execution of these and any related tasks, or any other appropriate combination of such tasks, and can generate a response to the request indicating the creation of a "database" in response to the "create database" request, which actually corresponds to a data store instance in the data plane 210, and provide the DNS address to be used to access the instance. A user then can access the data store instance directly using the DNS address and port, without having to access or go through the control plane 208. Various other workflow templates can be used to perform similar jobs, such as deleting, creating, or modifying one of more data store instances, such as to increase storage. In some embodiments, the workflow information is written to storage, and at least one separate execution component (not shown) pulls or otherwise accesses or receives tasks to be executed based upon the workflow information. For example, there might be a dedicated provisioning component that executes provisioning tasks, and this component might not be called by the workflow component, but can monitor a task queue or can receive information for a provisioning task in any of a number of related ways as should be apparent.

As mentioned, various embodiments can take advantage of a workflow service that can receive requests or calls for a current state of a process or task, such as the provisioning of a repository, and can return the current state of the process. The workflow component and/or workflow service do not make the actual calls or requests to perform each task, but instead manage the state and configuration information for the workflow that enables the components of the control plane to determine the next task to be performed, and any information needed for that task, then generate the appropriate call(s) into the data plane including that state information, whereby a component of the data plane can make the call to perform the task. Workflows and tasks can be scheduled in parallel in order to increase throughput and maximize processing resources. As discussed, the actual performing of the tasks will occur in the data plane, but the tasks will originate from the control plane. For example, the workflow component can communicate with a host manager, which can make calls into the data store. Thus, for a given task a call could be made to the workflow service passing certain parameters, whereby the workflow service generates the sequence of tasks for the workflow and provides the current state, such that a task for the present state can be performed. After the task is performed (or otherwise resolved or concluded), a component such as the host manager can reply to the service, which can then provide information about the next state in the workflow, such that the next task can be performed. Each time one of the tasks for the workflow is performed, the service can provide a new task to be performed until the workflow is completed. Further, multiple threads can be running in parallel for different workflows to accelerate the processing of the workflow.

The control plane 208 in this embodiment also includes at least one monitoring component 218. When a data instance is created in the data plane, information for the instance can be written to a data store in the control plane, such as a monitoring data store 220. It should be understood that the monitoring data store can be a separate data store, or can be a portion of another data store such as a distinct set of tables in an Admin data store 222, or other appropriate repository. A monitoring component can access the information in the monitoring data store to determine active instances 234 in the data plane 210. A monitoring component also can perform other tasks, such as collecting log and/or event information from multiple components of the control plane and/or data plane, such as the Web service layer, workflow component, sweeper component, and various host managers. Using such event information, the monitoring component can expose customer-visible events, for purposes such as implementing customer-facing APIs. A monitoring component can constantly monitor the health of all the running repositories and/or instances for the control plane, detect the failure of any of these instances, and initiate the appropriate recovery process(es).

Each instance 234 in the data plane can include at least one data store 226 and a host manager component 228 for the machine providing access to the data store. A host manager in one embodiment is an application or software agent executing on an instance and/or application server, such as a Tomcat or Java application server, programmed to manage tasks such as software deployment and data store operations, as well as monitoring a state of the data store and/or the respective instance. A host manager in one embodiment listens on a port that can only be reached from the internal system components, and is not available to customers or other outside entities. In some embodiments, the host manager cannot initiate any calls into the control plane layer. A host manager can be responsible for managing and/or performing tasks such as setting up the instances for a new repository, including setting up logical volumes and file systems, installing database binaries and seeds, and starting or stopping the repository. A host manager can monitor the health of the data store, as well as monitoring the data store for error conditions such as I/O errors or data storage errors, and can restart the data store if necessary. A host manager also perform and/or mange the installation of software patches and upgrades for the data store and/or operating system. A host manger also can collect relevant metrics, such as may relate to CPU, memory, and I/O usage.

The monitoring component can communicate periodically with each host manager 228 for monitored instances 234, such as by sending a specific request or by monitoring heartbeats from the host managers, to determine a status of each host. In one embodiment, the monitoring component includes a set of event processors (or monitoring servers) configured to issue commands to each host manager, such as to get the status of a particular host and/or instance. If a response is not received after a specified number of retries, then the monitoring component can determine that there is a problem and can store information in the Admin data store 222 or another such job queue to perform an action for the instance, such as to verify the problem and re-provision the instance if necessary. The sweeper can access this information and kick off a recovery workflow for the instance to attempt to automatically recover from the failure. The host manager 228 can act as a proxy for the monitoring and other components of the control plane, performing tasks for the instances on behalf of the control plane components. Occasionally, a problem will occur with one of the instances, such as the corresponding host, instance, or volume crashing, rebooting, restarting, etc., which cannot be solved automatically. In one embodiment, there is a logging component (not shown) that can log these and other customer visibility events. The logging component can include an API or other such interface such that if an instance is unavailable for a period of time, a customer can call an appropriate "events" or similar API to get the information regarding the event. In some cases, a request may be left pending when an instance fails. Since the control plane in this embodiment is separate from the data plane, the control plane never receives the data request and thus cannot queue the request for subsequent submission (although in some embodiments this information could be forwarded to the control plane). Thus, the control plane in this embodiment provides information to the user regarding the failure so the user can handle the request as necessary.

As discussed, once an instance is provisioned and a user is provided with a DNS address or other address or location, the user can send requests "directly" to the data plane 210 through the network using a Java Database Connectivity (JDBC) or other such client to directly interact with that instance 234. In one embodiment, the data plane takes the form of (or at least includes or is part of) a computing cloud environment, or a set of Web services and resources that provides data storage and access across a "cloud" or dynamic network of hardware and/or software components. A DNS address is beneficial in such a dynamic cloud environment, as instance or availability failures, for example, can be masked by programmatically remapping a DNS address to any appropriate replacement instance for a use. A request received from a user 202 or application 204, for example, can be directed to a network address translation (NAT) router 224, or other appropriate component, which can direct the request to the actual instance 234 or host corresponding to the DNS of the request. As discussed, such an approach allows for instances to be dynamically moved, updated, replicated, etc., without requiring the user or application to change the DNS or other address used to access the instance. As discussed, each instance 234 can include a host manager 228 and a data store 226, and can have at least one backup instance or copy in persistent storage 230. Using such an approach, once the instance has been configured through the control plane, a user, application, service, or component can interact with the instance directly through requests to the data plane, without having to access the control plane 232. For example, the user can directly issue structured query language (SQL) or other such commands relating to the data in the instance through the DNS address. The user would only have to access the control plane if the user wants to perform a task such as expanding the storage capacity of an instance. In at least one embodiment, the functionality of the control plane 208 can be offered as at least one service by a provider that may or may not be related to a provider of the data plane 210, but may simply be a third-party service that can be used to provision and manage data instances in the data plane, and can also monitor and ensure availability of those instances in a separate data plane 210.

Figure 3:
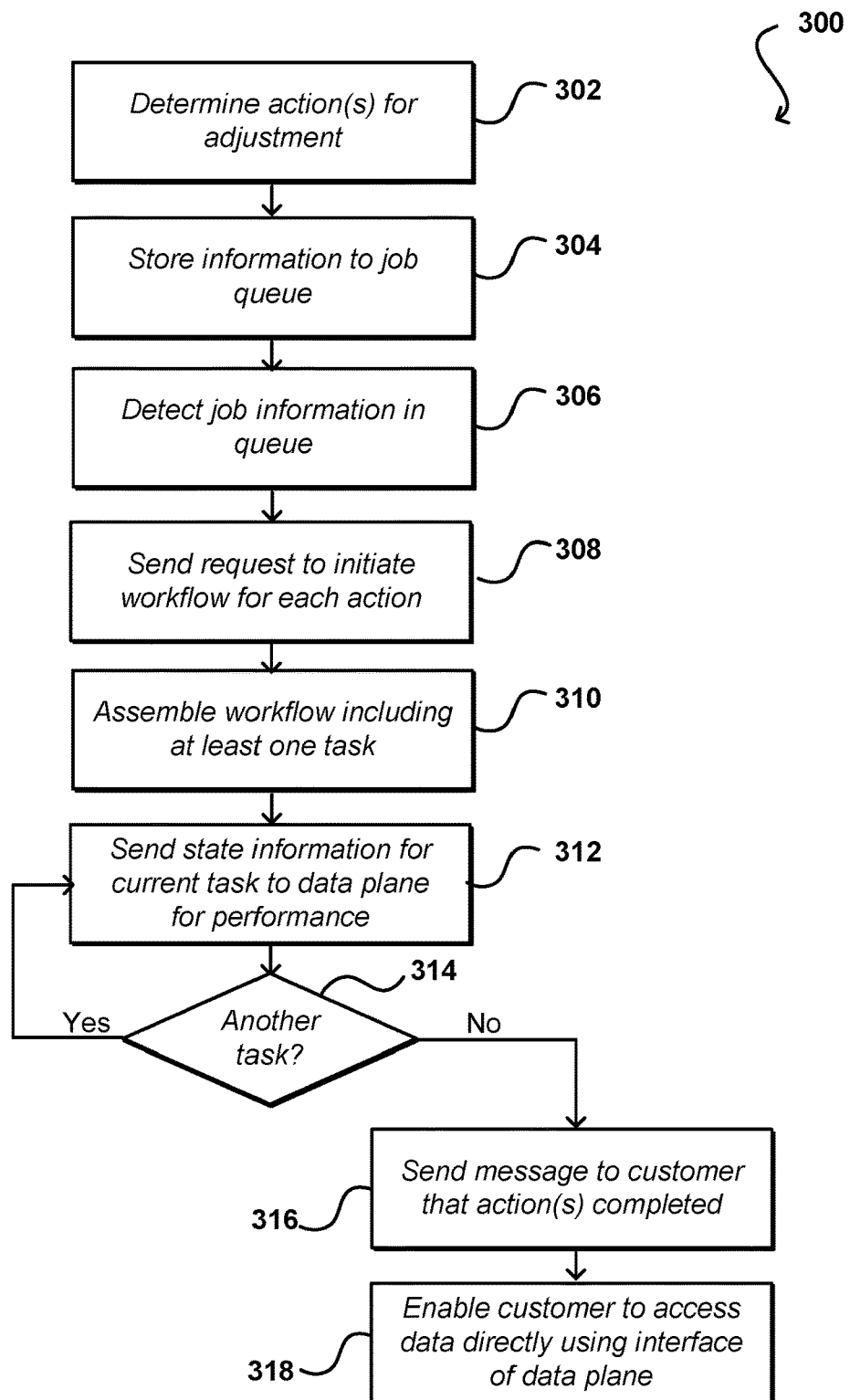
FIG. 3 illustrates an example process for performing an action in accordance with one embodiment.

FIG. 3 illustrates an example process 300 for performing an action and notifying the customer, in accordance with one embodiment. Using components and/or processes such as those discussed above, a determined action with respect to the data environment is authorized to be performed 302. As discussed, this can take the form of the monitoring component automatically requesting an action to be performed or a customer authorizing the performance of an action, while in other embodiments a customer could instead submit a request via an externally-facing API of the Web services layer, which can parse the request to determine the action(s) being requested. In this embodiment, information for the action, such as the type of action and parameters to be used to perform the action, is written to a job queue 304, such as may be located in an Admin data store or other such storage location. The job queue can be monitored, such as by a sweeper component, to determine the presence of job information 306 and, when job information is detected, a request can be sent to initiate a workflow for the requested action 308. This can include a request sent by the sweeper component to a workflow component and/or service to instantiate a workflow. In other embodiments, a workflow component might monitor the job queue for jobs, or a component of the Web services layer may send the job information directly to a workflow component.

Upon receiving the job information, the information is analyzed to determine and/or assemble an appropriate workflow for the requested action 310. As discussed, different tasks can be selected for the workflow based upon factors such as the type of action requested and the type of database engine being used. Beginning with the first task of the workflow, state information is sent to a host manager in the data environment operable to use the state information to determine a task to be performed, perform the task with respect to a data repository and/or data instance, and return a response upon completion of the task 312. Upon receiving the response, the workflow component determines whether there is another task to be performed 314. If so, state information for the next task is sent to the host manager, and upon completion of that task the host manager sends a response to the workflow component. After the final task has been completed, a message is sent to the requesting customer (or another appropriate user, application, or location) that the requested action has been completed 316. After the action has been performed, the customer is able to directly access the data instance upon which the action was performed using a data interface of the data environment, without accessing or passing through the control plane 318. As mentioned, the user can be provided with a DNS name and port number, for example, such that if the action resulted in movement of data or another similar action, the customer or an application can continue to use the same DNS name, which will be directed to the appropriate location in the data plane.

As discussed, one advantage to the use of a control plane is that the control plane can function as a virtual database administrator (DBA) and avoid the need for a human DBA to perform tasks such as monitoring performance data and performing trending or other such analysis. A control plane can also perform functions such as automatically performing scaling, recovery, or other such actions in the event of an actual or predicted need for action. Conventional approaches relying on a DBA to perform actions such as monitoring, analysis, cloning, and recovery are expensive and time-consuming, and can result in significant unavailability of customer data during the recovery and/or cloning processes.

A control plane can be used to perform tasks such as managing security and access groups for data stores, data instances, and other such aspects of a data plane or other such environment. A control plane can, in conjunction with the data plane, ensure that requests to perform certain actions in the data plane occur via the control plane. Thus, the control plane can manage user groups and control access for those tasks without modifying the default or native user information of the data environment. Such an approach enables access groups to be added, modified, or deleted without requiring an outage or other such unavailability of the corresponding data instance.

Figure 4:
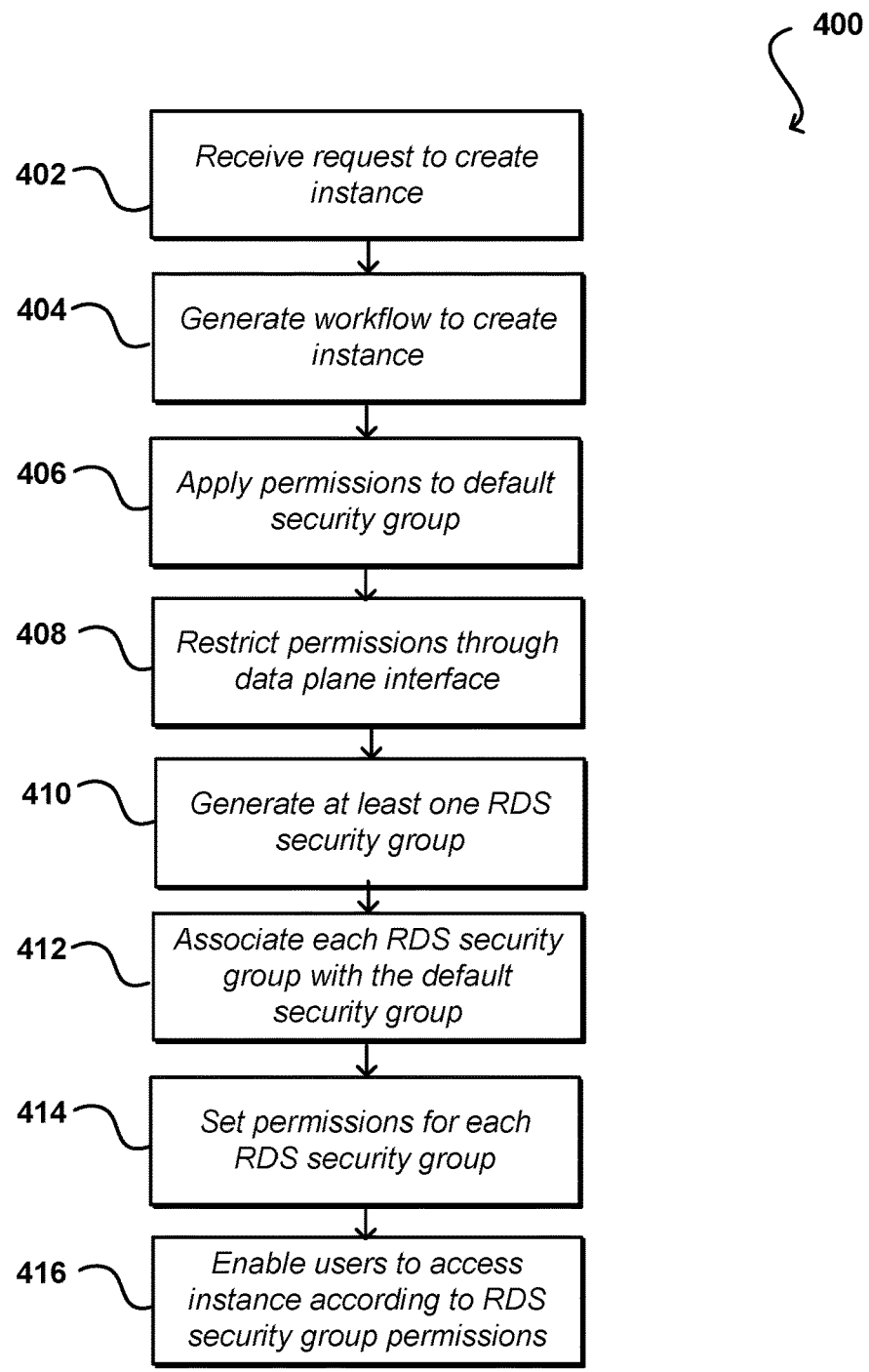
FIG. 4 illustrates an example process for associating a control security group with a default security group that can be used in accordance with one embodiment.

FIG. 4 illustrates an example process 400 for setting up a data store with control plane-based user management in accordance with one embodiment. In this example, a request is received from a customer (or other such user) requesting the creation of a data instance using a "create database" or similar call as discussed above 402. A workflow is generated and kicked off that includes tasks for creating the data instance 404. As part of the creation of the data instance, at least one default (or "native" from a data environment point of view) security user or security group is created in the data environment for the data instance. As part of the workflow, permissions can be applied to the default security group 406. Native access to the data instance through an API or other interface of the data plane can be restricted 408, such as by modifying or adding permission rules for the default security group. As part of the creation workflow, a separate workflow or process, and/or in response to a separate request, at least one RDS security group can be created for the data instance via the control environment 410. Each RDS security group for the data instance can be associated with the native control group in the data environment 412. Permissions can be set for each RDS security group 414, such as may include "read only" or "read and write" access. Once the data instance is created, customers or other authorized users are enabled to access the data instance according to permissions set in the appropriate RDS security group 416. Due to the restrictions on access through the data interface, a customer can be forced to call into the control environment to set or adjust access levels and/or permissions for users or groups of users.

Figure 5:
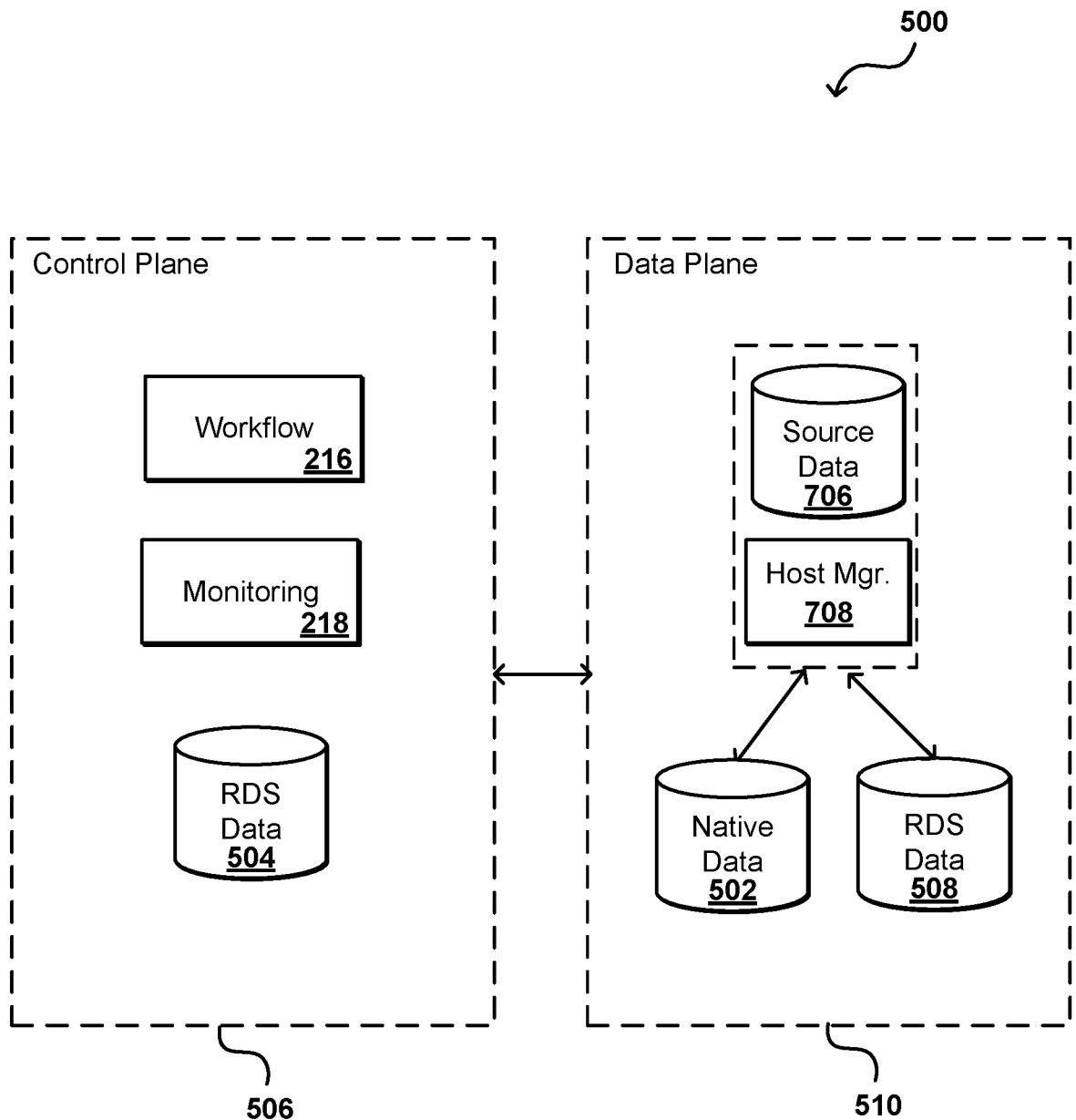
FIG. 5 illustrates components that can be used to store security group information in accordance with one embodiment.

FIG. 5 illustrates an example configuration 500 that can be used to store security group information in accordance with one embodiment. Reference numbers are carried over between figures for purposes of simplicity and explanation, but such use should not be construed as showing only a single embodiment or otherwise limiting the scope of the various embodiments. Further, only certain components are shown in each figure, but it should be understood that other, additional, or alternative components can be used as discussed and suggested herein. As illustrated, a data instance in the data environment includes a host manager and a data store, with information for the data store being stored to a native user data store 502. While shown as a separate data store, it should be understood that the native user data can be stored as part of another data store inside or outside the instance. When an RDS user group is associated with the native security group in the data environment, RDS user group information is created that can be stored in a data store 504 in the control environment 506 and/or a data store 508 in the data environment 510. Storing the RDS user group data in the data plane can allow users to access the data directly through an API or other interface of the data plane (assuming the users have such permission) without accessing the control plane. Storing the RDS user group data in the control environment allows the control plane to quickly access the information when required for a customer action, and enables the control plane to recover the groups more quickly in the event of a failure of the data environment. Other advantages can be obtained through storing the information in either or both locations.

As discussed, certain functionality can be disabled via the data plane. Customers can be restricted from modifying users through the data plane, and instead can utilize at least one API or interface of the control plane to make such changes. Even a "super user" created upon provisioning of a data instance cannot modify security user group information through the data plane in various embodiments. In one embodiment, separate APIs are provided for adding users, deleting users, modifying user information, and managing RDS security groups. Certain functionality can still be restricted, however. For example, customers may not be granted lower level access that allows the customers to request operations such as shutting down an instance in the data plane. APIs also can be provided that allow customers to obtain statistics or other data from a monitoring data store or other such location, relating to aspects such as identities of users accessing the data, types of access, etc.

A default or "super" user can typically perform low-level actions in the data environment such as changing schema or attributes of a data store, adding or deleting tables or rows, or other such actions. A customer might wish to add user groups with other levels of access, such as read-only access or access to specific tables. Various other levels of access can be granted as known in the art. In this example, however, calls to adjust users, users groups, data access, or other such functionality must be submitted through the control plane, such that the RDS user or security group information can be adjusted in the control environment. Since the RDS user information is tied to a native user group that does not change in the data environment, the changes do not require an outage of the data store or data instance.

In some embodiments, several data volumes in the data environment might make up a logical volume group associated with a data instance. Native permissions such as the ability to access, read, or write data to the data volumes can be handled through the control plane. The users can access the data instance independent of any knowledge of the underlying data volumes. The users are not given access to modify these native permissions through the data plane, but instead pass through an API or other interface of the control plane providing an identifier for the data instance.

When a data instance is created, customers can specify one or more security groups to restrict network access to the data instance. Customers can authorize access to the data instance by adding permission rules to the security group that are applied to the database via an AuthorizeDBSecurityGroupIngress or similar API. Customers can also add or remove security groups from a data instance at any time using a ModifyDatabase or similar API. Customers can create (or delete) security groups using a CreateDBSecurityGroup (or DeleteDBSecurityGroup) API.

As part of the CreateDatabase API, customers can supply a username and password for a special database user referred to herein as "Database Owner." Database Owner is a special type of user who owns the data schema objects. Customers are not allowed to manage users directly in a provisioned data store, so this functionality is provided in one embodiment through three additional APIs. After creation of a data instance, a customer can add more users to the database using a CreateDatabaseUser API, remove users using a DeleteDatabaseUser API, and list the users using a DescribeDatabaseUsers API.

In one example, a customer can have a self-managed "Customer" MySQL database that the customer wants to move to an RDS environment. The current "Customer" database has a 60 GB capacity, running with peak concurrent processes less than 50 and having storage growth estimates around 10% per month. Based on these initial capacity requirements, the customer selects an instance to be provisioned with an initial capacity of 80 GB. The customer chooses a master user and master user password, and based on firewall requirements chooses an appropriate port number (e.g., 9030) on which the data instance will be listening.

The customer, if not already signed up or subscribed to the control service, can sign up for the service. In some embodiments, the user will receive software or will access an interface page through the Internet, for example, that will allow a user to submit requests to the control plane or service. In other embodiments, a user can manually (or otherwise) create and submit Web service calls to the control plane. In the following example, the customer generates a request to create a new data repository using a command line tool. A request can take the form of, for example:

```
rds-create-database --identifier customerprod --dbname customer -
-size 80 -class small --engine mysql5.1 --master master_username
--password master_password --port 4030
```

When the customer executes a "create database" call using the API or command line tool, components of the Web service tier can prepare the control plane for provisioning. The Web service can authenticate and authorize the customer, validate request parameters, and create a record in the Admin data store for the customer data instance. The lifecycle in the record can be marked as "Creating," for example, which can be changed to a state such as "Pending" to prepare the creation job for pickup by a workflow sweeper or other such component.

With completion of the initial activity by the Web service tier, the data instance is ready to be provisioned. A sweeper can periodically poll the Admin data store for work to complete. A database record with a change state of "Pending" can cause the sweeper to launch a "CreateDatabase" or similar workflow instance. An initial action of the workflow can be to update the change state of the data instance to a state such as "Applying" so that other sweepers are aware the change is in progress and do not attempt to launch another workflow.

In one embodiment, the workflow takes the initial steps to provision the resources that will makeup the data instance. The tasks of such a workflow can include the creation of the instance in the data environment, with allocation of a DNS name and/or port allowing users to access the instance. Other tasks can allocate and attach the data volumes to be used for the data instance. Data volumes can be requested based on configuration information specifying aspects such as a maximum size of an individual volume, and the desired minimum number of data volumes. Multiple volumes are provisioned in at least one embodiment because a single volume can provide a limited number of input/output per second (IOPS) operations, which can be increased by provisioning multiple data volumes and striping or otherwise allocating the data instance across the data volumes.

An RDS security group can provide functionality that acts as a firewall or other barrier protecting a data store or data instance in the data environment. An RDS security group enables a customer to define aspects such as which IP (Internet protocol) range and/or instances can communicate with a data store. The RDS security group permissions can be implemented using the respective security group for each data store.

For example, a customer can apply two RDS security groups to a data instance (i.e., with a database identifier such as "mydbid") where a first RDS security group allows access from a classless inter-domain routing (CIDR) range "x.y.z.0" and a second RDS security group allows access from data instances associated with a first database security group, SecGroup1. In this example, a new security group (e.g., mydbidSecGroup) for the data store mydbid with permissions to allow access only from "x.y.z.0," and allow access from data instances with security group SecGroup1. The group mydbidSecGroup can be applied to the instance that hosts the data store. By using a new native security group for each data store, changes can be made to the first security group without restarting the data instance. Each data instance (provisioned by RDS) also can be a member of a default security group.

Once each of the core resources becomes available, the workflow can prepare the data instance with the necessary components. The data volumes can be attached to the instance, and files for the host manager can be loaded and verified. Once verified, the host manager application can be deployed and executed. In one embodiment, a Tomcat manager for the instance is requested to deploy and install a Host Manager WAR file, then start the host manager application. Once the host manager is running, the data instance has the functionality needed to install the database engine (e.g., MySQL, Oracle RDBMS, etc.) and setup the customer data store. The workflow can now communicate with the host manager, and pass information that causes the host manager to mount the data volumes and prepare the file system. A file system may need to be built for at least three roles: binary, logs, and data. To do this, the control plane in one embodiment sends a storage configuration file (i.e., an XML file) which provides the information to the host manager on the mount points and volumes to be used for each role. Using this information, the host manager can create the physical devices, such as by using a pvcreate or similar process, for all volumes provisioned for a given role. The host manager then can create a logical volume that stripes the data across these devices for each role.

A public signing key can be installed to the host manager, and the database engine can be downloaded and installed. A Tomcat server on the data instance can download and verify the signed package manager, followed by an unpack, installation, and launch of the package. A blank data store can be installed to be used as the basis of the customer data store, enabling permissions and tables used for management to be easily applied. The customer data store can be created and the root password for the data store changed. The master user also can be created as specified in the customer request.

The customer can have the ability to check on the provisioning status, and can request a connect string using the command line tool to describe the repository, such as by submitting:

describe-repositories customerprod

The customer can grant access to the default security group, such as from the address range 205.192.0.0/16 by:

authorize default -s 205.192.0.0/16

The customer also can check on the status of security changes, such as by submitting:

describe-group default

A "DescribeDatabases" or similar API can be used to determine the status of the request. While provisioning is still in progress, the status will show as "Pending Creation," for example, and can be changed to a state such as "Created" once the provisioning has been completed. At this point, the customer can have all the information necessary for connecting to the repository.

Once the provisioning process is completed, the instance is running and the customer data store can be exposed for customer use. As a final task of the workflow, a record in the Admin data store can be updated for the customer data store, such as to mark the lifecycle as "Available" and mark the change state as "none".

In this example, the customer also wants to implement data security through role-based access control. Before turning on the provisioned and loaded data instance and making the instance available, the customer wants to implement role-based access control such that a development team will have read/write access to the repository but business analysts will only obtain read access. The client also wants "master user" access limited to handful of senior users, so the remaining developers need a different database user role.

With respect to the control plane, the customer can submit a request to create a new database user or user group using the command line tool, for example, such as by submitting the following:

```
create-user --identifier customerprod --username develop1 --
    password develop1
create-user --identifier customerprod --username analyst1--
    password analyst1
```

The customer can also check on provisioning status for the request, such as by submitting:

describe-users customerprod

While provisioning is still in progress, the status can show a state such as "Pending Creation," and the status will be changed to a state such as "Created" once the provisioning has been completed. The customer can now perform necessary tasks for securing the users in the data plane.

The customer can, with respect to the data plane, perform an action such as granting read/write privileges to a develop1 user for all tables owned by master_username, such as by submitting through an API of the control plane:

```
$ mysql-u master_username -h end_point_hostname --port 4030 -p
    master1
Mysql>grant select, insert, update, delete on master_username.*
    to 'develop1'@'%';
```

The customer can also grant read privileges to an analyst1 user for all tables owned by master_username:

```
$ mysql-u master_username -h end_point_hostname --port 4030 -p
    master1
Mysql>grant select on master_username.*to'analyst1'@'%';
```

When the customer makes a request to describe users to the API or command line tool, the Web service tier can immediately fulfill the request by querying the Admin data store for configured permissions if the user name is specified. If the user name is not specified, the Admin data store can be queried for all users on the data store. The Web service tier also can perform tasks such as formatting the data according to the API specification, and responding to the customer request.

Alternatively, a customer can be provided with an application and/or interface that allows the customer to specify parameters, groups, and other such information, and will generate the appropriate calls into the APIs of the control plane. For example, FIG. 6 illustrates an example of an interface page 600 that can be used to apply or update security group information in accordance with one embodiment. In this example, a customer can specify a customer group or customer identifier 602, or other such identifier, which can correspond to a particular data store or data instance for which security settings are to be reviewed and/or updated. The customer also can be provided with user-selectable elements 604 enabling the customer to specify, add, or delete RDS security groups, as well as to adjust parameters for each group, such as access passwords and access levels. A customer also can see and/or update a status of a security group. In this example, it can be seen that a first security group "Developer1" has "read and write" access to the data instance, while "Analyst1" has "read only" access. Both groups are active. If a customer wants to update this information, the customer updates the appropriate fields or other element(s), which causes an appropriate request to be submitted to an interface of the control plane.

When the customer requests a new data store user via the API or command line tool, the control plane can manage the creation. A state of the data store is validated to ensure that the state allows for the creation of a user (e.g., not in a "Creating" or "Deleting" state). A record can be created for the user in the Admin data store with a "Creating" lifestyle and "Pending" change state. A sweeper polling the Admin data store will locate the user record with a change state of "Pending," and a lifecycle of "Creating" causes the sweeper to launch a workflow instance that satisfies the request. A first action is to update the change state to "Applying" or a similar state so that other sweepers are aware work is underway. The workflow can cause the user to be created for the data instance by requesting that the host manager create the user and updating the Admin data store user record to an "Available" lifestyle with a change state of "none".

There can be a number of other actions performed via the control plane relating to users and security groups. For example, a ResetUserPassword or similar API can be exposed via the Web service layer to allow users to change forgotten passwords. When a customer requests a database user password reset, the Web service layer can validate that the lifecycle allows such user operations (e.g., not in a "Creating" or "Deleting" state), and validate that the user lifecycle allows a password reset (e.g., set to "Available"). The record for the user can be updated in the Admin data store with a lifecycle of "Reset Password" and a change state of "Pending". A sweeper discovering such a record can launch a workflow that updates the change state to "Applying," and requests that the host manager modify the user password. The workflow then can update the record in the Admin data store to a lifecycle of "Available" and a change state of "None," and can notify the customer.

When the customer requests to delete a user, the Web service layer can validate that the lifecycle allows such user operations (e.g., not in a "Creating" or "Deleting" state), and validate that the user lifecycle allows a password reset (e.g., set to "Available"). The record for the user can be updated in the Admin data store with a lifecycle of "Deleting" and a change state of "Pending". A sweeper discovering such a record can launch a workflow that deletes the user by updating the change state to "Applying," and requesting that the host manager delete the user and disconnect any current connections. The workflow then can delete the record for the user in the Admin data store, and can notify the customer.

The customer can request a list of security groups for a data store or data instance, wherein if the security group name is specified, the Admin data store is queried for configured permissions of this group. If the security group name is not specified, the Admin data store can be queried for all security groups for the customer, or as according to any other parameter specified by the request.

If the customer requests a new RDS security group, a record can be created for the security group in the Admin data store with a status of "Active." If the customer requests to delete an existing RDS security group, the control plane can validate that no data stores or data instances are members of the security group, and removes the record for the security group in the Admin data store.

If the customer requests to add a new native security group in the data environment or modify an IP range for an existing native security group, the control plane can validate that the native security group state is "Active" and can add a new entry for the access rule in the Admin data store with a lifecycle of "Creating" and a change state of "Pending." A sweeper can pick up such a record and launch a workflow to authorize a new security group, and updates the change state to "Applying." A workflow can be launched with tasks for all data stores and/or data instances that are a member of the modified security group. For each affected member, the native security group permissions can be recomputed. When completed, the record for the security group in the Admin data store can be updated to a lifecycle of "Active" and a change state of "None."

If the customer requests removal of a native security group or reduction of an IP range for an existing native security group, the control plane can validate that the native security group state is "Active" and can update the record for the access rule in the Admin data store with a lifecycle of "Deleting" and a change state of "Pending." A workflow can be launched with tasks for all data stores and/or data instances that are a member of the modified security group.

As discussed previously, the use of a control plane or service in accordance with various embodiments does not restrict the type of SQL queries that a customer can run, and does not impose any restrictions relating to construction of a schema, such as to be partition ready and not allow queries spanning partitions. Instead, a repository such as a relational database can be provisioned in a computing "cloud" without restricting the users' schema or queries. As commonly known, even though there is a theoretical SQL standard, the SQL quirks, syntaxes and their behaviors (e.g., NULL handling) vary across different relational database engines (e.g., MySQL, Oracle, or Postgres). For at least these reasons, users may wish to choose a relational database engine that is familiar for purposes of programming and operations. Such an approach allows customers to use the same set of database tools that the customers have used previously for tasks such as data modeling, development, and debugging, even when the customers migrate their data stores to the cloud (or elsewhere) via the control plane. Using such an approach, customers are not required to rewrite their application or any operational tools, which lowers the barrier of entry significantly for customers to move data to the cloud.

A customer's data repositories can be moved to the cloud in one embodiment by running the repositories on compute nodes of a cloud computing environment. Block level storage volumes, such as off-instance storage volumes that persist independently from the life of an instance, can be used with these instances for storing the repository binary, logs and volumes, for example. Such an approach can be advantageous, as the virtualization provides flexibility to quickly and easily scale a compute and storage resources for a repository. Further, such an approach can provide for persistent storage in the cloud.

As known in the art, relational databases can be run in different modes, such as may include: stand-alone (non-replicated), replicated, or replicated and partitioned. A customer typically makes the choice of which mode to run for a repository based on the availability and scalability needs of the repository and the incurred total cost of ownership (TCO). Some applications and services do not require a repository to be highly available and durable, and may instead utilize a stand-alone repository that is able to tolerate outages on the order of minutes. Other applications and servers can require a repository to be always available, and require the repository to never lose data even in the event of a failure. In this case, the applications and services typically require a replicated database offering. Some users, applications, or services require a massively scalable repository that can partition data across multiple repositories, such that scaling can occur beyond the compute and storage capacity of a single database. To address these different use cases, an approach in accordance with one embodiment offers at least two modes, such as stand-alone and high availability, for each database engine. Some embodiments also allow customers build their own partitioning layer on top of either stand-alone or high availability repositories.

As mentioned, the control plane layer can take advantage, or "sit on top," of various basic software frameworks for performing tasks such as: implementing workflows, establishing secure communication channels between the host managers of the data plane and the components of the control plane, installing software on the instances of the data plane, and performing various database backup and recovery procedures.

One architecture that can be utilized advantageously relates to providing secure communications to the host managers of the data plane from the components of the host plane. In one embodiment, the workflow and monitoring components of the control plane are constantly communicating with the host managers to perform various tasks (e.g., database maintenance and software installation), as well as to check the status of the various instances and/or repositories. It is important in at least some embodiments that all communications between the control plane and the host managers occur over a secure network that prevents anyone from eavesdropping or issuing unauthorized commands to the host managers.

In one embodiment, all communication channels to the host managers are secure using a hypertext transfer protocol over a secure socket layer (SSL). Each application server hosting a host manager application can be started using scripts at bootup of an instance. Before starting the application server engine, a script can be executed that generates a self-signed certificate and installs the certificate to enable the SSL communication channel(s). SSL communication is used in one embodiment for encrypting the communication channel and not for client authentication. Client authentication is instead achieved with a public/private key signature embedded in each request, such that in one embodiment all clients sign query string parameters using a private key. This signature can be validated by a custom interceptor, which can be deployed with the application server for the host manager. Further, a security group (i.e., firewall rules) can be established for each monitored instance in the data plane such that only hosts sitting in a given network or secure group can communicate using the host manager port. Secure information and credentials (such as private keys) can be stored in an appropriate keystore, which can provide for functionality such as key management and rotation.

Another aspect that can be handled by taking advantage of various frameworks includes the management of various security aspects, such as secure keys and user credentials. Secure information such as secure keys and passwords can be stored using a secure key management system or service, such as is described in co-pending U.S. patent application Ser. No. 12/372,597, Feb. 17, 2009, and entitled "Encryption Key Management," which is hereby incorporated herein by reference. Such a service can contain at least two versions for each credential, an 'OLD' version and the current version. A key can be rotated, for example, by uploading the new value for the key to the service, such as by using the base name for the key, and launching a workflow to propagate that key value to host managers as needed. Once that workflow is terminated successfully, such that each appropriate host has the new credential, the old version of the key can be effectively replaced with the new value. If, for any credential, the old key does not match the new key, that is an indication that a key rotation process is currently underway. A new key rotation is not started if the old key does not match the current key, as such an approach can risk losing credentials that may still be in use. A command line utility or similar interface can be used to push keys to the key management service, which can enforce this check.

A separate workflow can be defined for updating and/or rotating credentials such as host manager credentials on all host manager instances. Such an approach can utilize the same inputs as a "SendCredentials" or similar API on the each host manager, such as credential type, public key, and optional private key. In place of the credential value, however, the workflow can will accept the name of the key used to store that value in the key management service. The workflow can verify that the current value is different from the new value, and if the values are the same the workflow can terminate with an appropriate error condition. For each active host managed by the control plane, a sub-workflow can be launched that will send the new credential(s) to the host managers on each host. Once all the sub-workflows are complete, the new credential value can replace the old value. Any host that is created or reactivated while this workflow is in progress typically will need to be given the new version of the credential instead of the original.

A sub-workflow for sending the credentials to a host can utilize require the same inputs as the original workflow, as well as the host name and port for the specific host manager. The sub-workflow can call an "UpdateCredentials" or similar API on the host manager for each specified credential, and can call a "GetCredentials" or similar API on the host manager to verify that the update has completed. The host manager in at least one embodiment will not report the new value for the credential until everything has been done to put the credential in place. If all host managers are not updated within an appropriate period of time, such as two hours (where two hours is configurable and easy to update as required), the workflow can time out and generate an error ticket or other such indication of failure. All the root/admin credentials used by a host manager to communicate with a repository can be stored in the Admin repository in an encrypted form. When rotating the keys to encrypt passwords in the Admin repository, the new keys can be uploaded to the management service and a workflow launched to re-encrypt all appropriate user passwords using the new key. Once that workflow completes successfully, the new encryption key can be used. In addition to changing the encryption keys, this workflow can also change the root password for each database. A workflow for rotating password encryption keys can verify that the new encryption key is different from the old encryption key, encrypt any user passwords for in-flight workflows with the new key, and encrypt the root passwords for any inactive repositories with the new key. Since the repository is inactive, the passwords may not be changed but can be re-encrypted with the new keys. For each active repository, a new root password can be generated and stored in a pending changes field (encrypted with the new key) and a sub-workflow can be launched for updating host manager credentials with the new password. When the sub-workflow completes, the new root password can be written back to the data repository, using the new encryption key. The root database password will not be changed when a repository is inactive, but the workflow that reactivates the repository can change the root password once the repository is active.

An approach in accordance with one embodiment utilizes a command line utility that wraps a remote command and enforces restrictions on how credentials are rotated. This can guarantee that public and private keys are only rotated in tandem, and that no key is rotated if a previous rotation is still in progress. The utility can verify that the keys were successfully deployed to all hosts and then launch the appropriate workflow in the appropriate control plane environment. A command line utility can use a syntax such as:

```
rotate-rds-key \
    --stage One of Devo, Integ, QA, or Prod\
    --type credential_type\
    --publicKey value for public key \
    --privateKey optional for some types; value for private key
```

Such a utility can fail if the current key is different from the old key on any host in the fleet, there is an error copying the new key to any host in the fleet, or the workflow step could not be started. In the case where the keys are already different, there may be no changes to roll back. The utility can roll back any changes in the other cases and alert the user of cases where the roll back was unsuccessful.

In a case where a host manager instance dies during an "UpdateCredentials" or similar workflow, allowing the workflow to retry can handle many scenarios with no special logic on the workflow side. Workflow steps other than the step that is updating credentials may receive "MissingCredential" or similar exceptions from which the workflows will need to recover. In such cases, it can be acceptable to send the new credential to the host manager. In the case of a database administration password, the password change may not have taken effect. The workflow step that tries to re-send the root password (as well as any other call to Host Manager that requires the root password from other workflows) can fail with a "MissingCredentials" or similar exception. Workflow steps other than the change password workflow can attempt to set the credential to the new password and handle any failures. The workflow that is actively trying to change the password can first try sending the new password. If that succeeds, the workflow is done; otherwise, the workflow can retry with the old password followed by the new password. If the host manager receives an "Update-Credentials" or similar call for the root password where the host manager does not currently have a password in memory, the host manager can attempt to connect to the repository using that password and fail if the connection cannot be established.

The rotations of various credentials and secure objects are accomplished in many instances without any noticeable impact on the customers. As the web service layer in many embodiments does not use any of these credentials as part of processing customer requests, the customer API calls can continue to proceed as normal. The impact of rotating a credential can vary somewhat depending on the type of credential being rotated. For example, when a new pair of Web services keys is generated, requests signed with the original pair may start to fail. This will only affect workflow steps, in general, which the workflow system can retry for a period of time. The new Web services credentials can be uploaded quickly to the management service in order to minimize the disruption to ongoing workflows. While workflows for generating and propagating new passwords are in progress, workflow boxes can have access to both old and new encryption keys, such that connections can be made to individual repositories and instances while each workflow is in progress. For host manager authentication keys, production hosts can have retry logic in place to retry connections with the old key if requests are being rejected. For RPM signing keys, host managers may be unable to install software for some time if a key is rotated.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system, comprising:
    at least one processor; and
    a memory, storing program instructions that when executed by the at least one processor cause the at least one processor to implement a data storage service, wherein the data storage service is configured to:
    receive, via a control plane interface, a request to add or update a control security group for a data instance in the data storage service that is associated with a native security group for the data instance, wherein the control plane interface provides a management interface for managing the data instance separate from a data plane interface for accessing data of the data instance;
    create or update the control security group for the data instance with a permission in the control security group that determines an access level of each member of the control security group without modifying the native security group;
    store the permission in the control security group created or updated according to the request for use in determining subsequent access to the data instance by a member of the control security group; and
    control access to the data instance via the data plane interface based, at least in part, on the control security group.

2. The system of claim 1, wherein a plurality of control security groups are associated with the data instance, including the control security group, and wherein each of the control security groups have at least one of a different set of permissions and a different set of members.

3. The system of claim 1, wherein to update the control security group includes at least one of deleting the control security group, adding at least one user, deleting at least one user, updating a password for the control security group, or modifying an access level of the control security group to the data instance in the data environment.

4. The system of claim 1, wherein the data instance is a partition of a database added for the database as part of automatically performing scaling of the database.

5. The system of claim 4, wherein the data storage service is configured to perform the scaling of the database responsive to an actual or predicted need for scaling the database.

6. The system of claim 1, wherein to create or update the control security group is performed while allowing access to the data instance according to an existing security group for the data instance.

7. The system of claim 1, wherein the data storage service is further configured to communicate information for the created or updated control security group to a host manager for the data instance in the data storage service.

8. A method, comprising:
    performing by one or more computing devices:
    receiving, via a control plane interface, a request to add or update a control security group for a data instance in a data storage service that is associated with a native security group for the data instance, wherein the control plane interface provides a management interface for managing the data instance separate from a data plane interface for accessing data of the data instance;
    creating or update the control security group for the data instance with a permission in the control security group that determines an access level of each member of the control security group without modifying the native security group;
    storing the permission in the control security group created or updated according to the request for use in determining subsequent access to the data instance by a member of the control security group; and
    controlling access to the data instance via the data plane interface based, at least in part, on the control security group.

9. The method of claim 8, wherein a plurality of control security groups are associated with the data instance, including the control security group, and wherein each of the control security groups have at least one of a different set of permissions and a different set of members.

10. The method of claim 8, wherein updating the control security group includes at least one of deleting the control security group, adding at least one user, deleting at least one user, updating a password for the control security group, or modifying an access level of the control security group to the data instance in the data environment.

11. The method of claim 8, wherein the data instance is a partition of a database added for the database as part of automatically performing scaling of the database.

12. The method of claim 11, wherein the data storage service is configured to perform the scaling of the database responsive to an actual or predicted need for scaling the database.

13. The method of claim 8, wherein the creating or updating the control security group is performed while allowing access to the data instance according to an existing security group for the data instance.

14. The method of claim 8, further comprising communicating information for the created or updated control security group to a host manager for the data instance in the data storage service.

15. One or more non-transitory, computer-readable storage media, storing program instructions that when executed on or across one or more computing devices cause the one or more computing devices to implement:
    receiving, via a control plane interface, a request to add or update a control security group for a data instance in a data storage service that is associated with a native security group for the data instance, wherein the control plane interface provides a management interface for managing the data instance separate from a data plane interface for accessing data of the data instance;
    creating or update the control security group for the data instance with a permission in the control security group that determines an access level of each member of the control security group without modifying the native security group;

storing the permission in the control security group created or updated according to the request for use in determining subsequent access to the data instance by a member of the control security group; and controlling access to the data instance via the data plane interface based, at least in part, on the control security group.

16. The one or more non-transitory, computer-readable storage media of claim 15, wherein a plurality of control security groups are associated with the data instance, including the control security group, and wherein each of the control security groups have at least one of a different set of permissions and a different set of members.

17. The one or more non-transitory, computer-readable storage media of claim 15, wherein updating the control security group includes at least one of deleting the control security group, adding at least one user, deleting at least one user, updating a password for the control security group, or modifying an access level of the control security group to the data instance in the data environment.

18. The one or more non-transitory, computer-readable storage media of claim 15, wherein the data instance is a partition of a database added for the database as part of automatically performing scaling of the database.

19. The one or more non-transitory, computer-readable storage media of claim 18, wherein the data storage service is configured to perform the scaling of the database responsive to an actual or predicted need for scaling the database.

20. The one or more non-transitory, computer-readable storage media of claim 15, wherein the creating or updating the control security group is performed while allowing access to the data instance according to an existing security group for the data instance.

* * * * *